UNITED STATES PATENT OFFICE.

EMIL SCHNAUFER AND HEINRICH HUPFELD, OF FRANKFORT-ON-THE-MAIN, GERMANY.

PROCESS OF MAKING ARTIFICIAL MUSK.

SPECIFICATION forming part of Letters Patent No. 412,545, dated October 8, 1889.

Application filed February 11, 1889. Serial No. 299,507. (No specimens.)

*To all whom it may concern:*

Be it known that we, EMIL SCHNAUFER and HEINRICH HUPFELD, both subjects of the Emperor of Germany, residing at Frankfort-on-the-Main, Germany, have invented new and useful Improvements in Artificial Musk, of which the following is a specification.

This invention relates to the manufacture of a substitute for musk.

To produce this artificial substitute, heat three kilograms of metaxylol with two kilograms of isobutylalcohol and nine kilograms of chloride of zinc, in a digester, to from 220° to 240° Celsius, until the pressure, which at the commencement is from twenty-five to twenty-nine atmospheres, sinks to below six atmospheres. The duration of the operation is from five to eight days. The resulting hydrocarbon, corresponding to the formula $C_{12}H_{18}$, is collected, and the fraction which distills over at from 190° to 230° is nitrated with $HNO_3$, or with $HNO_3$ and $H_2SO_4$ while being cooled. The product of the reaction is poured into water, whereupon a reddish-brown oil separates out, which is washed several times with alkaline water. The formula of this oil is $C_{12}H_{17}NO_5$, and in a concentrated condition it possesses a sweet smell, while in a dilute solution it gives off a penetrating and enduring musk-like odor.

We claim as new and desire to secure by Letters Patent—

The herein-described process of making an oil adapted to be used as a substitute for musk, which consists in digesting a mixture of metaxylol and isobutylalcohol with chloride of zinc, in nitrating the resulting hydrocarbon, and in separating the oil therefrom by dissolving out extraneous matter, substantially as herein set forth.

In testimony whereof we have signed our names to this specification in the presence of two subscribing witnesses.

EMIL SCHNAUFER.
HEINRICH HUPFELD.

Witnesses:
FRIEDRICH QUEHL,
JOSEPH PATRICK.